United States Patent Office 3,840,474
Patented Oct. 8, 1974

3,840,474
METHOD FOR SULFIDING SUPPORTED METAL CATALYSTS
Paul G. Bercik, Trafford, and Kirk J. Metzger, Pittsburgh, Pa., assignors to Gulf Research & Development Company, Pittsburgh, Pa.
No Drawing. Filed Nov. 13, 1972, Ser. No. 305,666
Int. Cl. B01j 11/74, 11/40
U.S. Cl. 252—439                                    12 Claims

ABSTRACT OF THE DISCLOSURE

An improved method for sulfiding metal supported catalysts which comprises initially sulfiding the metal catalyst in a hydrogen atmosphere and thereafter in a second stage, contacting the metal catalyst with a liquid containing a mercaptan in a hydrogen-free atmosphere.

BACKGROUND OF THE INVENTION

It is known, for example, to polymerize an olefin employing a catalyst comprising a Group VI or Group VIII metal component on a support. The metal component can be incorporated onto a support material such as alumina, silica-alumina, silica-magnesia or silica gel by any suitable manner such as co-precipitation, ion exchange and/or impregnation with a solution of a salt of a metal component.

The catalyst composite can then be calcined at a temperature in the range of 700 to about 1300° F. Following calcination, the catalyst composition can be subjected to a reduction step for the purpose of converting the oxide to a metal component. The reduction can be effected by contacting the catalyst with hydrogen at an elevated temperature, conventionally in the range of 500 to about 850° F.

In a number of hydrocarbon conversion processes, such as selective olefin dimerization processes, it is preferred that the catalyst composition be subjected to a presulfiding operation which is designed to incorpate sulfur in the catalyst composite. Typically, the presulfiding procedure comprises treating the calcined catalyst which may optionally be reduced with a sulfiding gas such as a mixture of hydrogen and hydrogen sulfide having about 2 volume percent hydrogen sulfide at conditions sufficient to effect a desired incorporation of the sulfur component, generally, to include maintaining a temperature in the range from about 50° F. up to about 1100° F.

The presulfiding processes of the prior art are capable of incorporating only a limited amount of sulfur in the catalyst composite, the mol ratio of sulfur to metal component dispersed on the surface of the support generally being less than 0.49. In many processes, such as the selective dimerization of isobutylene, it is desirable to employ metal-support catalyst compositions having a sulfur to metal mol ratio of at least 0.55, and preferably higher. Furthermore, it may be desirable to have as much as .05 to 0.5 percent by weight adsorbed sulfur as mercaptan on the catalyst. Prior art sulfiding processes will not provide this adsorbed mercaptan.

Accordingly, an object of the invention is to provide an improved process for sulfiding a supported metal catalyst composition.

Another object of the invention is to provide a novel sulfided supported metal catalyst composition.

Yet another object of the invention is to provide improved hydrocarbon conversion processes employing the novel sulfided supported metal catalyst composition.

A further object of the invention is to provide an improved selective isobutylene dimerization process employing the novel sulfided supported metal catalyst composition.

Other objects, advantages and features of this invention will be readily apparent to those skilled in the art from the following description and the appended claims.

SUMMARY OF THE INVENTION

By the invention an improved sulfided supported metal catalyst composition is provided by a process which comprises initially contacting a supported metal catalyst with a sulfur compound at an elevated temperature in the presence of hydrogen, and thereafter contacting the catalyst in a hydrogen free atmosphere with a liquid containing a mercaptan compound. The novel sulfided catalyst compositions are employed in hydrocarbon conversion processes, particularly olefin polymerization, olefin isomerization, olefin disproportionation, aromatic alkylation, paraffin alkylation, paraffin isomerization and mercaptan sweetening processes.

DESCRIPTION OF THE INVENTION

The invention is directed to the sulfiding of metal dispersed on the surface of catalyst support material. Although the invention will hereafter be described as it relates specifically to Group VI and Group VIII metals contained on conventional support material, it is not intended to limit the invention thereto.

In preparation of the catalyst composition a supported material such as an acidic amorphous silica-alumina in particulate form can be impregnated with a Group VI or Group VIII metal compound, e.g., an inorganic salt. As heretofore noted, other metals and support materials can be employed. For example, the invention is particularly effective in the sulfiding of nickel available on the surface of a nickel-substituted fluorine-enriched synthetic mica montmorillonite catalyst composite.

A preferred method of preparation involves contacting the support with an aqueous solution of an inorganic metal salt. The salt can then be converted to the oxide after drying by calcining in an oxygen containing atmosphere at a temperature in the range of 850° F. to 1300° F. for a period normally ranging from 0.5 to 48 hours.

In addition to the metal component, the support optionally can contain a catalyst promoter such as fluorine or the fluorine ion. Such promoters can be impregnated onto the support material by conventional methods of impregnation or addition.

The calcined catalyst composition can optionally be subjected to a reduction step. The reduction step can be effected by heating the catalyst composition in the presence of hydrogen to an elevated temperature, normally to a temperature of at least 600° F.

Supported metal catalyst compositions prepared by the above or other conventional processes can then be sulfided by the novel two-stage process as hereafter described. In the first stage the catalyst is treated with a sulfur compound in the presence of hydrogen. A preferred method comprises treating the catalyst with a hydrogen and hydrogen sulfide mixture at an elevated temperature in the range of 50 to about 1100° F. or more, preferably at a temperature exceeding 300° F., with the concentration of hydrogen in the vaporous mixture being at least 50 mol percent. The pressure in the treating zone will range from atmospheric to 1000 p.s.i.g. with the initial treating step being conducted for a period ranging from 0.5 to 48 hours. The concentration of the hydrogen sulfide in the mixture contacting the catalyst is such that the sulfur in the hydrogen sulfide exceeds the weight of the metal dispersed on the catalyst surface. Although not to be limited thereto, contact between the catalyst and hydrogen sulfide mixture can be effected by passing the gaseous mixture over a fixed bed of the catalyst.

The initial sulfiding step can be conducted with the sulfur compound in the vaporous or liquid phase. In addition to hydrogen sulfide other sulfiding agents such as the lower molecular weight mercaptans and organic sulfides can be utilized. After completion of the initial sulfiding step, the concentration of sulfur in the catalyst composition will normally be such that the mol ratio of sulfur to metal dispersed on the support surface will range from 0.2 to 0.49.

The catalyst which has been initially sulfided in the presence of hydrogen is then subjected to a second sulfiding step which is conducted in a hydrogen-free atmosphere. In this second step, the catalyst composition is contacted with a liquid containing a mercaptan in a substantially hydrogen-free atmosphere. The liquid employed in the second sulfiding step can be a conventional inert solvent for the mercaptan or can comprise the hydrocarbon feed which is to be subsequently converted with the aid of the catalyst composition in the conversion process. The concentration of mercaptan in the inert solvent or hydrocarbon feed is in the range of 0.001 to 3.0 weight percent.

Temperature in the sulfiding zone is maintained in the range from ambient up to 240° F., preferably less than 200° F. In this second stage, the catalyst composition is exposed to about 0.1 to 7.0 or more weight of sulfur (as mercaptan) per weight of metal dispersed on a catalytic surface. Time of contact between the liquid containing the mercaptan and the catalytic composition will range from about 2 to about 48 hours. The mercaptan blend is passed over the catalyst at a rate equal to 0.5 to 4.0 weights of blend per weight of catalyst per hour.

A portion of the mercaptan employed in the second sulfiding step is adsorbed on the catalyst support and contributes to the stabilization of the catalyst composition so that the adsorbed mercaptan comprises at least 0.05 weight percent of the catalyst composition. Following completion of the second sulfiding step, the sulfided catalyst composition will contain sulfur concentration of at least 0.55, and preferably from 0.6 to 1.0 mol of sulfur per mol of metal dispersed on the surface of the support.

The sulfided catalyst composition can be employed in a number of hydrocarbon conversion processes such as olefin polymerization, olefin isomerization, olefin disproportionation, aromatic alkylation, paraffinic alkylation, paraffinic isomerization, and mercaptan sweetening processes. The sulfided catalyst composition is particularly effective in hydrocarbon conversion processes which are conducted in a substantially hydrogen-free atmosphere and at a temperature below 450° F. such as in the selective dimerization of isobutylene contained in a $C_4$ hydrocarbon refinery stream.

These $C_4$ hydrocarbon refinery streams can contain a concentration of sulfur varying from about 10 parts per million to 300 parts per million, generally as mercaptan sulfur. In the selective dimerization of isobutylene contained in such streams by utilizing the novel sulfided catalysts of the invention, a substantial improvement in selectivity is obtained when compared with the dimerization processes employing the conventionally sulfided catalysts. Additionally, the novel sulfided catalyst composition appears to be inert to additional mercaptans which may be introduced with the hydrocarbon feed to the dimerization zone, thereby resulting in a more stable and predictable process when compared to conventional dimerization processes.

In the selective dimerization of isobutylene employing the novel sulfided catalyst composition, liquid weight hourly space velocities in the range of 0.5 to 2.8 are normally employed. Contact between the catalyst and the vaporous or liquid hydrocarbon feed can be effected in a fixed or fluidized catalyst bed.

The pressure in the dimerization zone is normally maintained in the range of 70 to 600 p.s.i.g., preferably 400 to 600 p.s.i.g., in a liquid phase hydrocarbon operation. Vaporous phase dimerization reactions are conducted at a higher pressure with a pressure in the range of 600 to 1200 p.s.i.g. being preferred to sustain a dense phase operation. Liquid phase operation temperatures in the range of 70 to 300° F. are employed with a vaporous hydrocarbon phase operation being conducted at a temperature above 300° F.

The following examples are presented to illustrate objects and advantages of the invention. It is not intended, however, to limit the invention to specific embodiments illustrated therein.

EXAMPLE 1

This example illustrates the effectiveness of the novel sulfided catalyst composition to selectively dimerize isobutylene contained in a $C_4$ hydrocarbon feed mixture. The composition of the hydrocarbon feed employed in this example is as follows:

Hydrocarbon analyses, weight percent:
| | |
|---|---|
| Isobutane | 53.6 |
| Normal butane | 0.0 |
| Isobutylene | 9.9 |
| Butene-1 | 9.6 |
| Butene-2 | 26.9 |

The catalyst composition employed in this example comprised 3.0 weight percent nickel on a Triple A silica-alumina support which had been enriched to contain 2.0 weight percent fluorine. The catalyst support comprised 75 weight percent silica and 25 weight percent alumina and had a particle size of 10–20 mesh, a surface area of 470 square meters per gram, a pore volume of 0.83 cc. per gram, and an average pore diameter of 71 A. units. The acidity of the catalyst support was equal to 0.505 milliequivalents of ammonia per gram as determined by ammonia adsorption at 350° F.

The catalyst composition was reduced prior to the initial sulfiding at 600 p.s.i.g. pressure with 1100 gaseous hourly volume space velocity of pure hydrogen during a six hour heat-up and one hour hold at 650° F. The reduced catalyst composition was then sulfided initially by contacting the catalyst with a hydrocarbon blend comprising 3000 p.p.m. sulfur as carbon disulfide in pure grade normal heptane at a temperature of 650° F. and a pressure of 600 p.s.i.g. for a period of 22 hours with about 5800 standard cubic feet of pure hydrogen per barrel of blend and 1.1 weights of blend per weight of catalyst per hour. The sulfided catalyst contained 0.49 mol of sulfur per mol of nickel dispersed on the support.

The catalyst composition presulfided as indicated above was employed in the selective dimerization of the above-identified $C_4$ hydrocarbon stream which contained no sulfur. The continuous dimerization run was conducted for a period of 6 hours at a temperature of 102° F., a pressure of 400 p.s.i.g. and a liquid weight hourly space velocity (LWHSV) of 1.0.

Analysis of the product stream withdrawn from the dimerization zone indicated that all of the isobutylene had been converted to the dimer or higher polymer and 23.8 percent of the normal butenes had been polymerized. The product had an API gravity of 54.2, a research octane number (clear) of 99.0. The oligomer distribution in the product was as follows:

| | Weight percent |
|---|---|
| Dimer | 47.1 |
| Trimer | 40.4 |
| Tetramer | 11.6 |
| Pentamer | 0.9 |
| Hexamer | 0.0 |

The catalyst composition as defined above and initially sulfided by the above-described sulfiding procedure and after being employed in the above dimerization process with a sulfur free feed was subjected to a second sulfiding step whereby the sulfided catalyst was treated with a liquid dimerization feed containing an added mercaptan. The $C_4$ hydrocarbon feed containing 230 parts per million (p.p.m.) sulfur as 2-methyl-1-propane-thiol was passed over the sulfided catalyst composition until 0.49 gram of sulfur, as a mercaptan, had been brought into contact with each gram of nickel dispersed on the catalyst surface. This treatment step was conducted at a temperature ranging from 90 to 160° F., a pressure of 400 p.s.i.g., and a LWHSV ranging from 1.0 to 2.5. The mercaptan treatment step was conducted for 1.8 days.

Following completion of the mercaptan treatment step, the catalyst composition will contain greater than 0.05 weight percent sulfur as mercaptan adsorbed on the surface of the catalyst and a total sulfur concentration of 0.57 mol per mol of nickel dispersed on the catalyst support.

The two-step sulfided catalyst composition was employed as a fixed bed in the selective dimerization of isobutylene employing the above-identified $C_4$ hydrocarbon mixture. The dimerization process was conducted continuously for a period of 20 hours at a temperature of 142° F., a pressure of 400 p.s.i.g., and an LWHSV of 1.0.

During the run 98.3 percent of the isobutylene was converted to oligomers and 1.7 percent of the normal butenes were converted to oligomers. The product had an API gravity of 58.9 and a research octane (clear) of 101.6. The oligomer distribution of the product was as follows:

| | Weight percent |
|---|---|
| Dimer | 59.7 |
| Trimer | 35.5 |
| Tetramer | 4.6 |
| Pentamer | 0.2 |
| Hexamer | 0.0 |

A comparison of the product obtained after employing a conventional sulfiding step with the product obtained after the catalyst composition had been sulfided by the novel two-step process clearly demonstrates the effectiveness of the invention to provide an improved catalyst. Whereas 23.8 percent of the normal butenes were converted to oligomers in the first run, only 1.7 percent of the normal butenes were converted in the second run. Moreover, 59.7 percent of the polymer product was in the desired form (dimer) in the second run whereas only 47.1 percent of the oligomer product of the first run was in the form of dimer. Only 4.8 percent of the oligomer product was in the form of tetramers or heavier in the second run whereas 12.5 percent of the oligomers product in the first run comprises tetramers or heavier. Finally, by sulfiding the catalyst composition in the novel two-step method, a substantial improvement in octane, from 99.0 to 101.6, was obtained.

EXAMPLE 2

In this example the effectiveness of the two-step sulfiding process to obtain a catalyst composition which is selective for the dimerization of isobutylene and the isomerization of butene-1 in a $C_4$ hydrocarbon feed mixture is demonstrated. The catalyst composition employed in this example comprised a 16.2 weight percent nickel substituted synthetic mica montmorillonite support which was enriched to contain 1.2 weight percent fluorine.

The catalyst composition was sulfided in the initial stage by contacting the catalyst with a vaporous mixture comprising 98.0 volume percent hydrogen and 2.0 volume percent hydrogen sulfide at a temperature of 652° F., a pressure of 600 p.s.i.g., and at 333 gas volume hourly space velocity (GVHSV). The sulfiding step was conducted for a period of 24 hours until the catalyst contained 0.23 mol of sulfur per mol of nickel dispersed on the catalyst surface.

In the second sulfiding step, the sulfided catalyst composition was contacted with a liquid isobutane stream containing 1.5 weight percent methyl mercaptan at a temperature of 140° F., a pressure of 400 p.s.i.g. and at a LWHSV of 1.0 for a period of 10 hours. During the second sulfiding step the isobutane contained sufficient sulfur that 5.9 gram of sulfur was brought into contact with each gram of nickel dispersed on the catalyst support. Following completion of the second sulfiding step, the catalyst composition contained 0.63 mol of sulfur per mol of nickel dispersed on the catalyst support. Greater than 0.05 weight percent of the sulfur is estimated to be adsorbed on the catalyst surface as methyl mercaptan.

The sulfided catalyst composition was employed in a hydrocarbon conversion process wherein the isobutylene in a $C_4$ hydrocarbon feed mixture was selectively dimerized and the butene-1 contained in the hydrocarbon feed was isomerized to butene-2. The $C_4$ hydrocarbon feed to the process contained 53 parts per million of sulfur as ethyl mercaptan, 10.0 weight percent isobutylene, 10.0 weight percent butene-1, 24.8 weight percent butene-2, 55.1 weight percent isobutane, and 0.1 weight percent n-butane. The hydrocarbon conversion process was conducted at a temperature of 122° F., a pressure of 400 p.s.i.g. and a LWHSV of 1.0. The continuous process was conducted for a period of 28 hours.

Analysis of the product showed that 65.7 percent of the isobutylene was converted to the oligomers and 1.1 percent of the normal-butenes where polymerized. The product had an API gravity of 61.4 and a research octane number (clear) of 100.6. Further analysis of the product established an oligomer distribution as follows:

| | Weight percent |
|---|---|
| Dimer | 64.9 |
| Trimer | 32.2 |
| Tetramer | 3.8 |
| Pentamer | 0.0 |
| Hexamer | 0.0 |

In addition to the oligomers produced in the hydrocarbon conversion process, 19.6 percent of the butene-1 was isomerized to butene-2.

The continued operation of the dimerization process for a period in excess of twenty days demonstrated that the presence of mercaptan sulfur in the feed could be tolerated in the dimerization process with no significant adverse effects clearly demonstrating the stability of the catalyst.

EXAMPLE 3

In this example the criticality of the low temperature hydrogen-free mercaptan treatment of the presulfied catalyst composition is demonstrated. The catalyst composition of Example 2 was initially sulfided under the conditions described in Example 2.

Following the initial sulfiding step, the catalyst composition was subjected to a low temperature treatment with a gaseous stream comprising a 98 volume percent hydrogen and 2 volume percent hydrogen sulfide at a temperature of 153° F. and at a pressure of 1 atmosphere. The hydrogen sulfide treatment of the sulfided catalyst was continued until the amount of sulfur brought into contact with the catalyst comprised 4.22 gram sulfur per gram of nickel dispersed on the catalyst support.

The two-step sulfided catalyst composition was then employed in the selective dimerization of isobutylene contained in a $C_4$ hydrocarbon stream which comprised 13.7 weight percent isobutylene, 8.3 weight percent butene-1, 24.1 weight percent butene-2, and 54.9 weight percent isobutane. The dimerization process was conducted at a temperature of 94° F., a pressure of 400 p.s.i.g. and a LWHSV of 4.0. The polymerization run was conducted for a period of 4 hours.

Analysis of the product indicated that 100% of the isobutylene had been converted to oligomers and 9.4% of the normal-butenes had been converted to oligomers. A comparison of the results obtained in this example with the results obtained in the previous Example 2 demonstrates that the two-stage sulfided catalyst of Example 2 is substantially more selective in the isobutylene dimerization process.

Further analysis of the product obtained in this run shows that the API gravity was 56.7 and the research octane number (clear) was 99.2. The oligomer distribution of the product was as follows:

| | Weight percent |
|---|---|
| Dimer | 46.3 |
| Trimer | 38.3 |
| Tetramer | 13.5 |
| Pentamer | 1.6 |
| Hexamer | 0.2 |

A comparison of the oligomer distribution obtained in this run with the oligomer distribution of Example 2 demonstrates the effectiveness of the novel two-step sulfided catalyst composition to selectively dimerize the isobutylene and reduce the formation of trimers and heavier oligomers. Additionally, substantial improvement in gasoline product octane number was obtained by the dimerization process of Example 2.

Although the invention has been described with reference to specific embodiments, references, and details, various modifications and changes will be apparent to one skilled in the art and are contemplated to be embraced in the invention.

We claim:

1. A process which comprises initially contacting a catalyst composition comprising a metal dispersed on a support material with a sulfur compound at an elevated temperature in the presence of hydrogen, and thereafter contacting said catalyst in a substantially hydrogen-free atmosphere with a liquid solvent containing a mercaptan compound at a temperature below 240° F.

2. The process of Claim 1 wherein said catalyst composition is contacted with said liquid containing a mercaptan compound at a temperature below 200° F.

3. The process of Claim 1 wherein contact between the catalyst composition and the liquid containing the mercaptan compound in a substantially hydrogen-free atmosphere is maintained for a period of 2 to 48 hours and wherein the concentration of sulfur in said mercaptan liquid blend is such that about 0.1 to 7.0 or more weight of sulfur per weight of metal to be sulfided is contacted with the catalyst.

4. The process of Claim 3 wherein said catalyst composition comprises from 0.5 to 20 weight percent of a Group VI or a Group VIII metal and 0 to 5.0 weight percent fluorine on an acidic amorphous or crystalline silica-alumina support, said support comprising from 50 to 90 weight percent silica.

5. A catalyst composition comprising a sulfided metal dispersed on a catalyst support, the concentration of sulfur being at least 0.55 mol per mol of dispersed metal.

6. The catalyst composition of Claim 5 wherein the concentration of sulfur in the form of adsorbed mercaptan comprises at least 0.05 weight percent of the catalyst composition.

7. The catalyst composition of Claim 6 wherein the concentration of sulfur comprises from 0.6 to 1.0 mol per mol of dispersed metal.

8. The catalyst composition of Claim 5 wherein said metal comprises from 0.5 to 20 weight percent of a Group VI or Group VIII metal and said support comprises an acidic amorphous or crystalline silica-alumina.

9. A process which comprises initially contacting a catalyst composition comprising a metal dispersed on a support material with hydrogen sulfide at a temperature in the range from 50 to 1100° F. in the presence of hydrogen, and thereafter contacting said catalyst composition in a substantially hydrogen-free atmosphere with an inert liquid solvent containing a mercaptan compound at a temperature below 240° F., said mercaptan compound selected from the group consisting of 2-methyl-1-propane-thiol and methyl mercaptan.

10. The process of Claim 9 wherein the temperature at which the hydrogen sulfide is contacted with the catalyst composition exceeds 300° F.

11. The process of Claim 9 wherein the concentration of hydrogen in the gaseous mixture contacting the catalyst composition is at least 50 mol percent.

12. A process which comprises initially contacting a catalyst composition comprising a metal dispersed on a support material with a sulfur compound selected from the group consisting of hydrogen sulfide and carbon disulfide at an elevated temperature in the presence of hydrogen, and thereafter contacting said catalyst composition in a substantially hydrogen-free atmosphere with an inert liquid containing a mercaptan compound at a temperature below 240° F., said mercaptan compound selected from the group consisting of 2-methyl-1-propane-thiol and methyl mercaptan.

References Cited

UNITED STATES PATENTS

| 3,477,963 | 11/1969 | Van Verrooy | 252—439 |
| 3,296,119 | 1/1967 | Bicek | 252—439 X |

CARL F. DEES, Primary Examiner

U.S. Cl. X.R.

252—441, 455 R